United States Patent
Wang et al.

(10) Patent No.: US 10,751,810 B2
(45) Date of Patent: Aug. 25, 2020

(54) VERTICAL-EDGE DOUBLE-STEP SAWTOOTH CUTTER FOR PREPARING HIGH-QUALITY HOLES OF COMPOSITE MATERIAL AND HYBRID STACK STRUCTURE THEREOF

(71) Applicant: Dalian University of Technology, Dalian (CN)

(72) Inventors: Fuji Wang, Dalian (CN); Zhenyuan Jia, Dalian (CN); Meng Zhao, Dalian (CN); Yu Bai, Dalian (CN); De Cheng, Dalian (CN); Chong Zhang, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/465,266

(22) PCT Filed: May 10, 2018

(86) PCT No.: PCT/CN2018/086288
§ 371 (c)(1),
(2) Date: May 30, 2019

(87) PCT Pub. No.: WO2019/213888
PCT Pub. Date: Nov. 14, 2019

(65) Prior Publication Data
US 2020/0147701 A1  May 14, 2020

(51) Int. Cl.
*B23B 51/02* (2006.01)

(52) U.S. Cl.
CPC .......... *B23B 51/02* (2013.01); *B23B 2226/27* (2013.01); *B23B 2251/04* (2013.01);
(Continued)

(58) Field of Classification Search
CPC ............... B23B 51/02; B23B 2251/04; B23B 2251/043; B23B 2251/085; B23B 2251/406; Y10T 408/906
See application file for complete search history.

(56) References Cited

U.S. PATENT DOCUMENTS 2,918,955 A * 12/1959 Simas .................. B23D 61/003
408/22
3,667,857 A * 6/1972 Shaner et al. .......... B23B 51/08
408/230
(Continued)

FOREIGN PATENT DOCUMENTS

CN          104999118 A    10/2015
CN          105034076 A    11/2015
(Continued)

OTHER PUBLICATIONS

International Search Report and Written Opinion dated May 10, 2018, in International Application No. PCT/CN2018/086288.

*Primary Examiner* — Eric A. Gates
(74) *Attorney, Agent, or Firm* — Muncy, Geissler, Olds & Lowe, P.C.

(57) ABSTRACT

A vertical-edge double-step sawtooth cutter for preparing high-quality holes of composite material and thereof hybrid stack structure, and has three parts which are a major cutting edge region A, a minor cutting edge region B and a shank region C. The minor cutting edge region B comprises a step vertical-edge region D and a sawtooth cutting region E. This has the step structure and the sawtooth structure which is distributed in the first step, has a recutting function at the inlet and a reverse cutting function at the outlet in the direction opposite to the main cutting motion. The cutter has the vertical edge structure distributed in the second step, and the angle of the second step is a negative value, thereby (Continued)

realizing chip breaking and crushing, reducing scratch to the upper-layer composite material and metal hole walls.

1 Claim, 2 Drawing Sheets

(52) U.S. Cl.
CPC ... *B23B 2251/043* (2013.01); *B23B 2251/085* (2013.01); *B23B 2251/406* (2013.01); *Y10T 408/906* (2015.01)

(56) References Cited

U.S. PATENT DOCUMENTS

| | | | | |
|---|---|---|---|---|
| 4,936,721 A * | 6/1990 | Meyer | ............... | B23B 51/08 |
| | | | | 408/224 |
| 4,943,191 A * | 7/1990 | Schmitt | ............ | B23G 5/184 |
| | | | | 408/1 R |
| 5,221,163 A * | 6/1993 | Nishimura | ......... | B23C 5/10 |
| | | | | 407/53 |
| 5,636,948 A * | 6/1997 | Rexius | ............ | B23B 51/02 |
| | | | | 407/54 |
| 5,807,039 A * | 9/1998 | Booher | ............ | B23B 51/02 |
| | | | | 408/224 |
| 6,007,276 A * | 12/1999 | Wardell | ............ | B23C 5/10 |
| | | | | 407/54 |
| 8,882,412 B2 | 11/2014 | Sampath | | |
| 2018/0257150 A1* | 9/2018 | Jia | ................. | B23B 51/02 |

FOREIGN PATENT DOCUMENTS

| | | |
|---|---|---|
| CN | 108608040 A | 10/2018 |
| EP | 2202018 A1 | 6/2010 |

\* cited by examiner ured angle in *Development of a Dill Bit for CFRP/Aluminum-Alloy Stack: To Improve Flexibility, Economical Efficiency and Work Environment* published on. SAE Technical Paper.

VERTICAL-EDGE DOUBLE-STEP SAWTOOTH CUTTER FOR PREPARING HIGH-QUALITY HOLES OF COMPOSITE MATERIAL AND HYBRID STACK STRUCTURE THEREOF

TECHNICAL FIELD

The present invention belongs to the technical field of drilling tools in machining, and relates to a vertical-edge double-step sawtooth cutter for preparing high-quality holes of composite material and laminated structure thereof.

BACKGROUND

Composite material has been widely used in the manufacture of advanced aircraft parts due to the advantages of light weight, high strength and integral manufacture, and has become the optimal material for realizing the light weight of aircraft structures. For example, airbus A 350 uses 52% of composite material, which greatly reduces the weight of the aircraft structure and improves the fuel economy of the aircraft. In addition, to ensure that the aircraft can withstand complicated loads such as impact and alternation, a laminated structure composed of the composite material and high-performance metal is often used in supporting and connecting parts of the aircraft. In order to realize connection and assembly of composite parts and laminated structure parts, a series of machining is needed. Hole preparation processing is one of machining methods with the heaviest workload.

However, the composite material is mainly composed of a fiber reinforced phase and a resin matrix phase in a mixed form, presents obvious anisotropy and lamination characteristics at the macro level, and has low interlayer bonding strength. When the composite material is drilled separately, the axial force generated is large, and the constraint effect of inlet and outlet positions is weak. The most outer layers of material are easily pushed apart, resulting in layered damage, and failure to cut fibers, thereby leading to fiber bending, tear, burrs and other damages. Furthermore, in integrated hole preparation of the composite material/the metal hybrid stack material, such an installation mode that the composite material is on the upper side and the metal is on the lower side is often adopted. In this installation mode, the supporting effect of a metal material outlet side is weak, and it is easy to produce burrs. Moreover, in the cutting process, the metal is easy to produce continuous ribbon chips; in the removal process along flutes, metal chips are easy to scratch the composite material on the upper layer, resulting in difficulty to realize high-quality and high-efficiency processing of the hybrid stack structure of the composite material. Therefore, it is urgent to develop independently a cutter that can not only realize the high-quality hole preparation of the composite material but also realize the high-quality hole preparation of the hybrid stack structure of the composite material.

At present, some scholars have researched and developed hole preparation cutters of the composite material and hole preparation cutters of the hybrid stack structure of the composite material. For hole preparation cutters of the composite material, Jia Zhenyuan et al. of Dalian University of Technology has disclosed a "special drill for efficient hole preparation of carbon fiber reinforced polymer/plastic (CFRP)" with a patent application number of 201510408743.7. The patent relates to a double-vertex angle structure drill with tooth-shaped micro blade for hole preparation of the CFRP. Through the double-vertex angle structure of the major cutting edge, the sawtooth structure of the connecting part of the major cutting edge and the minor cutting edge realizes the integrated processing function of drilling, expanding and reaming, and obtains holes with high dimensional precision. However, because the sawtooth structure is located in the cutting edge which is finally cut, it is easy to cause small tear damage at the outlet and the inlet, and reduce the smoothness of the hole wall. A low chisel edge drill is invented by Suzhou Ahno Precision Cutting Tool Technology Co., Ltd. with a patent application number of 201310104178.6. The drill head is provided with two chip removal slots which form two major cutting edges respectively with the intersecting line of a tool back in the axial direction. The patent has the main feature of three centers, with the middle center lower than the centers on both sides. This design gives consideration to both tool strength and centering capability, and the two external centers can effectively scrape the fibers around the hole and reduce burrs. However, when processing high-strength fibers and composite material with low interlayer strength, it is easy to produce tear damage. For the hole preparation tool of the hybrid stack structure of the composite material, Japanese Kawasaki Heavy Industries Ltd. has proposed a composite material/aluminum alloy hybrid stack step drill with thin transverse cutting variation angle in *Development of a Dill Bit for CFRP/Aluminum-Alloy Stack: To Improve Flexibility, Economical Efficiency and Work Environment* published on. SAE Technical Paper. The tool improves the quality of integrated hole preparation to a certain extent by reducing the single cutting quantity. However, the problem of highly reliable chip breaking of the metal is still not fully considered, resulting in the accumulation of a large number of metal chips and winding on the tool in the process of drilling and further resulting in eccentricity of the tool in the rotary process, thereby seriously affecting the precision of hole preparation and the service life of the tool.

SUMMARY

The technical problem to be solved by the present invention is to reduce damage such as outlet layering of composite material, metal output burr and scratch of metal hole walls when composite material and hybrid stack structure thereof are drilled. The present invention provides a vertical-edge double-step sawtooth cutter for preparing high-quality holes of composite material and hybrid stack structure thereof. The cutter is a right hand helix drill with vertical edge structure, double-step structure and sawtooth structure. The vertical edge structure can effectively bend metal chips to prevent continuous strip chips from scratching upper-layer composite material and metal hole walls. Meanwhile, the step angle of the double-step structure is a negative value. Metal outlet burr and outlet burr of the composite material are removed from roots. The sawtooth structure is distributed around the drill axis with a large helix angle, to effectively inhibit damage such as inlet and outlet layering and burr of the composite material and finally realize high quality hole preparation of the composite material and the hybrid stack structure thereof.

The technical solution of the present invention is:

A vertical-edge double-step sawtooth cutter for preparing high-quality holes of composite material and hybrid stack structure thereof comprises three parts which are a major cutting edge region A, a minor cutting edge region B and a shank region C, wherein the minor cutting edge region B comprises a step vertical-edge region. D and a sawtooth cutting region E;

a major cutting edge 1 of the major cutting edge region A partially thins an initial cutting face 8 to obtain a second cutting face 9; the initial cutting face 8 and the second cutting face 9 form a double-vertex angle structure, wherein a first vertex angle $n_1$ is 100° to 106° and a second vertex angle $n_2$ is 90° to 95°;

a double-step structure is distributed on the minor cutting edge region B; a first step is near a point side and a second step is near a shank side; the minor cutting edge region B has two chip grooves 6 and forms two minor cutting edges 5; a helix rake angle $\gamma_1$ of the minor cutting edges 5 is 14° to 16°; the width c of the chip grooves is 0.6-0.8 time of a first step diameter d of the cutter; margin width a of a vertical chip breaking edge 4 and margin width b of the minor cutting edges 5 are 1-1.5 mm, and the margin width a of the vertical chip breaking edge 4 is larger than the margin width b of the minor cutting edges 5;

the step vertical-edge region D adopts a double-step negative-step angle structure, and an included angle $n_3$ between a second step major cutting edge 10 and a cutter axis 7 is larger than 90°; a vertical chip breaking edge 4 is thinned on each minor cutting edge 5; the axial length e of the vertical chip breaking edge 4 is at least 2 times of feed per tooth of the cutter; a helix rake angle $\gamma_2$ of the vertical chip breaking edge 4 is 13° to 15°;

the sawtooth cutting region E is located between the step vertical-edge region D and the major cutting edge region A and is composed of a plurality of sawteeth 3 and tooth spaces 2 which are distributed on a drill cutting edge; the sawteeth 3 and the tooth spaces 2 are spiral around a drill axis; a helix angle β of the sawteeth is an acute angle larger than 60°; upper edges of the sawtooth 11 of the sawteeth 3 are used as sawtooth cutting edges, and the upper edges of the sawtooth 11 are thinned to form a rake angle; the width $W_g$ of the tooth spaces of the sawteeth 3 is not less than the thickness of two layers of prepreg of processed fiber-reinforced material and is at least 0.3 mm; the tooth width $W_t$ of the sawteeth 3 is at least 0.5 mm; the depth $D_t$ of the tooth spaces 2 is at least 0.8 mm; and the sum of twice the depth $D_t$ of the tooth spaces and the thickness of a drill core is less than the diameter d of the cutter in this position in order to achieve the purpose of shear machining of the sawteeth 3 without affecting the stiffness of the drill core.

The vertical-edge double-step sawtooth cutter for preparing high-quality holes of composite material and hybrid stack structure thereof in the present invention has the step structure and the sawtooth structure which is distributed in the first step, has a recutting function at the inlet and a reverse cutting function at the outlet in the direction opposite to the main cutting motion and effectively inhibits damage such as inlet and outlet layering and burr of the composite material. The cutter has the vertical edge structure distributed in the second step, and the angle of the second step is a negative value, thereby realizing chip breaking and crushing, reducing scratch to the upper-layer composite material and metal hole walls, removing the metal outlet burr and outlet burr of the composite material from roots and improving outlet quality of the metal and the composite material.

In the figures: 1 major cutting edge; 2 tooth space; 3 sawtooth; 4 vertical chip breaking edge; 5 minor cutting edge; 6 chip groove;

7 cutter axis; 8 initial cutting face; 9 second cutting face; 10 second step major cutting edge;

11 upper edge of the sawtooth; A major cutting edge region; B minor cutting edge region; C shank region; D step vertical-edge region; E sawtooth cutting region;

a margin width of vertical chip breaking edge 4; b margin width of minor cutting edge 5; c width of chip groove;

d first step diameter; e axial length of vertical chip breaking edge 4; $n_1$ first vertex angle of major cutting edge 1;

$n_2$ second vertex angle of major cutting edge 1; $n_3$ included angle between second step major cutting edge and cutter axis 7;

$\gamma_1$ helix rake angle of minor cutting edge 5; $\gamma_2$ helix rake angle of vertical chip breaking edge 4; $W_t$ sawtooth width; $W_g$ width of tooth space; $D_t$ depth of tooth space; and β helix angle of sawtooth.

DETAILED DESCRIPTION

Detailed description of the present invention is described below in detail in combination with accompanying drawings and the technical solution.

Figure 1:
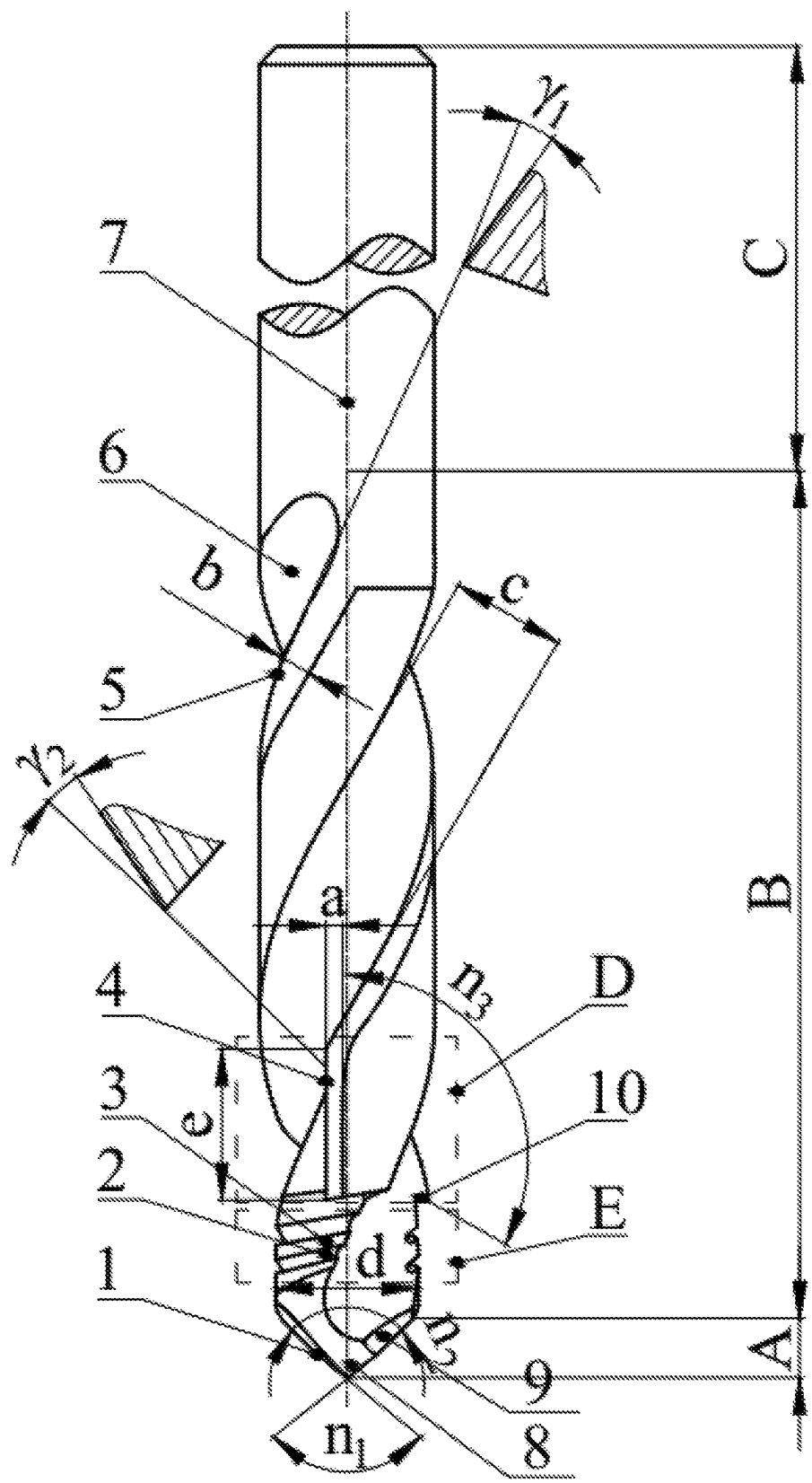
FIG. 1 is a main view of a vertical-edge double-step sawtooth cutter for preparing high-quality holes of composite material and hybrid stack structure thereof.
Figure 2:
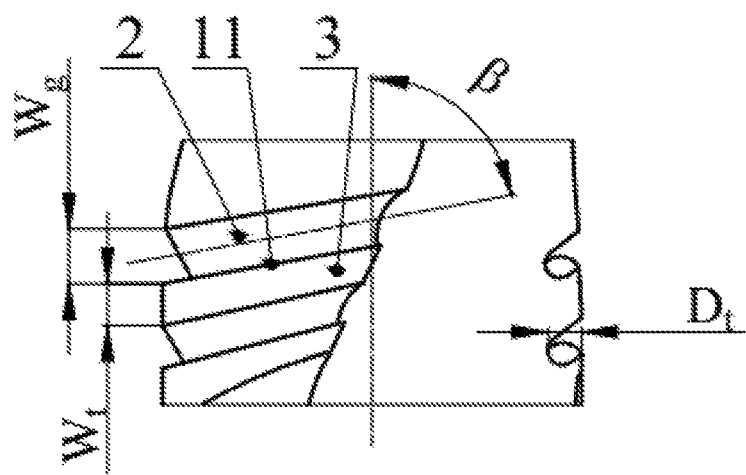
FIG. 2 is a partial enlarged drawing of a sawtooth cutting region E in FIG. 1.

As shown in FIG. 1 and FIG. 2, a vertical-edge double-step sawtooth cutter for preparing high-quality holes of composite material and hybrid stack structure thereof in the present invention comprises three parts which are a major cutting edge region A, a minor cutting edge region B and a shank region C, wherein the minor cutting edge region. B comprises a step vertical-edge region D and a sawtooth cutting region E. A major cutting edge 1 of the major cutting edge region A partially thins an initial cutting face 8 to obtain a second cutting face 9 so as to form a double-vertex angle structure; progressive cutting can be realized, so as to reduce the axial force and improve the drilling quality of the composite material, wherein a first vertex angle $n_1$ is 102° and a second vertex angle $n_2$ is 90°. The minor cutting edge region B has two chip grooves 6 and forms two minor cutting edges 5. A helix rake angle $\gamma_1$ of the minor cutting edges 5 is 15°. The nominal diameter of the cutter is 6 mm. The diameter d of the first step is 4.88 mm. The width c of the chip grooves is 3 mm. The ratio of the width c of the chip grooves to the diameter d of the first step of the cutter is 0.61, which can ensure that the rigidity of the cutter satisfies processing requirements. The margin width a of a vertical chip breaking edge 4 is 1.5 mm. The margin width b of the minor cutting edges 5 is 1 mm. The value of the margin width a of the vertical chip breaking edge 4 is larger, to ensure the strength of the vertical chip breaking edge 4.

The step vertical-edge region D adopts a double-step negative-step angle structure. The double-step structure is adopted to realize segmented cutting and reduce the axial force, so as to achieve the purpose of achieving the damage to the composite material. The second step adopts a negative step angle which can directly remove the metal outlet burr and outlet burr of the composite material from outlet roots. An included angle $n_3$ between a second step major cutting edge 10 and a cutter axis 7 is 110°. A vertical chip breaking edge 4 is thinned on each minor cutting edge 5 to change the original movement direction of metal chips to bend the metal chips and realize efficient chip breaking and crushing of the tam. Thus, the chips can be smoothly discharged along the chip grooves, thereby reducing the contact among the chips, the composite material and the metal hole walls and improving the finish degree of the hole walls and aperture accuracy. The axial length e of the vertical chip breaking edge 4 is 4 mm, which is much larger than feed per tooth of the cutter. A helix rake angle $\gamma_2$ of the vertical chip breaking edge 4 is 13°.

The sawtooth cutting region E is composed of a plurality of sawteeth 3 and tooth spaces 2 which are distributed on a drill cutting edge; the sawteeth 3 and the tooth spaces 2 are spiral around a drill axis; and a helix angle β of the sawteeth is 79°. Upper edges of the sawtooth 11 of the sawteeth are used as sawtooth cutting edges, and are thinned to form a rake angle which is 20°. The sawtooth structure is located between the step vertical-edge region D and the major cutting edge region A. The quantity of the sawteeth 3 is three. The width $W_g$ of the tooth spaces of the sawteeth 3 is 0.7 mm. The width $W_t$ of the sawteeth 3 is 0.5 mm. The depth $D_t$ of the tooth spaces is 0.8 mm. The thickness of a drill core of the cutter is 2.2 mm. The sum of twice the depth $D_t$ of the tooth spaces and the thickness of the drill core is less than the diameter d of the cutter in this position. When the composite material is drilled, the generated burrs bounce back into the sawtooth structure at the outlet and the inlet of drilling. In the process of downward drilling, the burrs that bounce back into the sawtooth structure are cut, and sheared, so as to effectively remove the burrs at the outlet and the inlet in the drilling process, reduce the effect of a tear damage during formation of a final hole and substantially enhance the cutting ability of the cutter.

The vertical-edge double-step sawtooth cutter for preparing high-quality holes of composite material and hybrid stack structure thereof in the present invention has the step structure which can realize segmented cutting and reduce processing damage. Meanwhile, the step angle is a negative value. Metal outlet burr and outlet burr of the composite material are removed from roots, thereby improving outlet quality. The vertical-edge structure changes the original movement direction of the metal chips, can bend and break the metal chips and can reduce the scratch of the metal chips to the upper-layer composite material and the metal hole walls. The sawtooth structure can effectively inhibit damage of drilling inlet and outlet layering and burr of the composite material. Finally, high-quality and high-efficiency processing of preparing high-quality holes of the composite material and the hybrid stack structure thereof is realized.

The invention claimed is:
1. A vertical-edge double-step sawtooth cutter for preparing high-quality holes of composite material and hybrid stack structure thereof, comprising three parts which are a major cutting edge region, a minor cutting edge region and a shank region, wherein the minor cutting edge region comprises a step vertical-edge region and a sawtooth cutting region; a major cutting edge of the major cutting edge region partially thins an initial cutting face to obtain a second cutting face; the initial cutting face and the second cutting face form a double-vertex angle structure, wherein a first vertex angle ($n_1$) is 100° to 106° and a second vertex angle ($n_2$) is 90° to 95°; a double-step structure is distributed on the minor cutting edge region; a first step is near a point side and a second step is near a shank side; the minor cutting edge region has two chip grooves and forms two minor cutting edges; a helix rake angle ($\gamma_1$) of the minor cutting edges is 14° to 16°; the width (c) of the chip grooves is 0.6-0.8 times a first step diameter (d) of the cutter; margin width (a) of a vertical chip breaking edge and margin width (b) of the minor cutting edges are 1-1.5 mm, and the margin width (a) of the vertical chip breaking edge is larger than the margin width (b) of the minor cutting edges; the step vertical-edge region adopts a double-step negative-step angle structure, and an included angle ($n_3$) between a second step major cutting edge and a cutter axis is larger than 90°; a vertical chip breaking edge is thinned on each minor cutting edge; the axial length (e) of the vertical chip breaking edge is at least 2 times of feed per tooth of the cutter; a helix rake angle ($\gamma_2$) of the vertical chip breaking edge is 13° to 15°; the sawtooth cutting region is located between the step vertical-edge region and the major cutting edge region and is composed of a plurality of sawteeth and tooth spaces which are distributed on a drill cutting edge; the sawteeth and the tooth spaces are spiral around a drill axis; a helix angle (β) of the sawtooth is an acute angle larger than 60°; upper edges of the sawtooth are used as the cutting edges, and the upper edges of the sawteeth are thinned to form a rake angle; the width ($W_g$) of the tooth spaces of the sawteeth is not less than the thickness of two layers of prepreg of processed fiber-reinforced material and is at least 0.3 mm; the tooth width ($W^r$) of the sawteeth is at least 0.5 mm; the depth ($D_t$) of the tooth spaces is at least 0.8 mm; and the sum of twice the depth ($D_t$) of the tooth spaces and the thickness of a drill core is less than the diameter (d) of the cutter in this position in order to achieve the purpose of shear machining of the sawteeth without affecting the stiffness of the drill core.

\* \* \* \* \*